United States Patent
Ehrlich et al.

(10) Patent No.: US 9,940,051 B2
(45) Date of Patent: Apr. 10, 2018

(54) POWER STATE CHANGE IN DISK DRIVE BASED ON DISK ACCESS HISTORY

(71) Applicant: KABUSHIKI KAISHA TOSHIBA, Tokyo (JP)

(72) Inventors: Richard M. Ehrlich, Saratoga, CA (US); Eric R. Dunn, Cupertino, CA (US); Daniel Tchen, San Jose, CA (US); Annie Mylang Le, San Jose, CA (US); Mine Wonkyung Budiman, Livermore, CA (US); Fernando Anibal Zayas, Rangiora (NZ)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/172,072

(22) Filed: Jun. 2, 2016

(65) Prior Publication Data
US 2016/0283155 A1 Sep. 29, 2016

Related U.S. Application Data

(62) Division of application No. 13/788,502, filed on Mar. 7, 2013, now abandoned.

(51) Int. Cl.
*G06F 1/32* (2006.01)
*G06F 3/06* (2006.01)

(52) U.S. Cl.
CPC .......... *G06F 3/0625* (2013.01); *G06F 1/3228* (2013.01); *G06F 1/3268* (2013.01);
(Continued)

(58) Field of Classification Search
CPC .... G06F 1/3228; G06F 1/3268; G06F 3/0625; G06F 3/0653; G06F 3/0676; Y02B 60/1246
See application file for complete search history.

(56) References Cited

U.S. PATENT DOCUMENTS

| 4,933,785 A | 6/1990 | Morehouse et al. |
| 5,682,273 A | 10/1997 | Hetzler |

(Continued)

FOREIGN PATENT DOCUMENTS

| JP | H08190703 A | 7/1996 |
| JP | 2001250315 A | 9/2001 |

(Continued)

OTHER PUBLICATIONS

Japanese Office Action dated Nov. 15, 2016, filed in Japanese counterpart Application No. 2014-000299, 8 pages (with translation).

*Primary Examiner* — Thomas Lee
*Assistant Examiner* — Chad Erdman
(74) *Attorney, Agent, or Firm* — Patterson & Sheridan, LLP

(57) ABSTRACT

A data storage device that includes a magnetic storage device selects one or more power states of the magnetic storage device based on a time interval since a most recent time data has been read from or written to the magnetic storage device. The power state of the magnetic storage device can be changed from a higher power consumption state to a lower power consumption state when the time interval exceeds a predetermined value. The power consumption state may be changed from an active servo state to an intermediate power consumption state, a park state, and/or a standby state, depending on the time elapsed since the most recent time data has been read from or written to the magnetic storage device.

8 Claims, 4 Drawing Sheets

(52) U.S. Cl.
CPC .......... G06F 3/0653 (2013.01); G06F 3/0676 (2013.01); *Y02B 60/1246* (2013.01)

(56) References Cited

U.S. PATENT DOCUMENTS

| | | | | |
|---|---|---|---|---|
| 5,787,292 A | * | 7/1998 | Ottesen | G11B 19/02 360/71 |
| 5,872,669 A | | 2/1999 | Morehouse et al. | |
| 5,907,859 A | * | 5/1999 | Shimada | G06F 3/0625 711/112 |
| 6,385,000 B1 | * | 5/2002 | Ottesen | G11B 5/553 360/63 |
| 6,556,371 B1 | * | 4/2003 | Ottesen | G11B 5/59627 360/77.04 |
| 7,334,082 B2 | | 2/2008 | Grover et al. | |
| 7,426,647 B2 | | 9/2008 | Fleck et al. | |
| 7,542,225 B1 | * | 6/2009 | Ding | G11B 5/5534 360/69 |
| 2003/0165099 A1 | * | 9/2003 | Watt | G11B 7/08505 369/53.3 |
| 2004/0174631 A1 | | 9/2004 | Tanaka et al. | |
| 2005/0066207 A1 | | 3/2005 | Fleck et al. | |
| 2005/0093495 A1 | * | 5/2005 | Kobayashi | G11B 19/20 318/268 |
| 2005/0144377 A1 | | 6/2005 | Grover et al. | |
| 2005/0162997 A1 | * | 7/2005 | Lee | G11B 7/08529 369/44.29 |
| 2005/0174678 A1 | * | 8/2005 | Zayas | G11B 19/26 360/73.03 |
| 2005/0268132 A1 | | 12/2005 | Yun et al. | |
| 2005/0289368 A1 | | 12/2005 | Chang et al. | |
| 2006/0075185 A1 | | 4/2006 | Azzarito et al. | |
| 2008/0130156 A1 | | 6/2008 | Chu et al. | |
| 2009/0059414 A1 | | 3/2009 | Lee et al. | |
| 2009/0231751 A1 | | 9/2009 | Asakura et al. | |
| 2010/0195463 A1 | * | 8/2010 | Kurashige | G11B 19/02 369/53.45 |
| 2011/0172000 A1 | | 7/2011 | Quigley et al. | |
| 2012/0042182 A1 | * | 2/2012 | Fulkerson | G06F 1/3268 713/320 |

FOREIGN PATENT DOCUMENTS

| | | |
|---|---|---|
| JP | 2002175679 A | 6/2002 |
| JP | 2005235384 A | 9/2005 |
| JP | 2010176771 A | 8/2010 |

* cited by examiner

POWER STATE CHANGE IN DISK DRIVE BASED ON DISK ACCESS HISTORY

CROSS-REFERENCE TO RELATED APPLICATION

This application is a divisional of U.S. patent application Ser. No. 13/788,502, filed Mar. 7, 2013, the entire contents of which are incorporated herein by reference.

BACKGROUND

Disk drives primarily store digital data in concentric tracks on the surface of a data storage disk and are commonly used for data storage in electronic devices. The data storage disk is typically a rotatable hard disk with a layer of magnetic material thereon, and data are read from or written to a desired track on the data storage disk using a read/write head that is held proximate to the track while the disk spins about its center at a constant angular velocity. To properly align the read/write head with a desired track during a read or write operation, disk drives generally use a closed-loop servo system that relies on servo data stored in servo sectors written on the disk surface when the disk drive is manufactured.

Some operations in a disk drive use a significant amount of energy, even when read or write commands are not being serviced by the disk drive. For example, continuously spinning the data storage disk requires approximately the same power whether or not read or write commands are being performed. Similarly, actively controlling read/write head position with the servo system involves performing servo sampling, signal processing, and associated decoding with a read channel, all of which utilize substantial computational resources, independent of read or write commands. Because disk drives are frequently used in portable electronic devices in which available power is limited, such as laptop computers, restricting such energy-intensive operations in a disk drive is generally desirable.

SUMMARY

One or more embodiments provide systems and methods for storing data in a data storage device that includes a magnetic storage device. During operation, the data storage device selects one or more power states of the magnetic storage device based on a time interval since a most recent time data has been read from or written to the magnetic storage device. Specifically, the power state of the magnetic storage device can be changed from a higher power consumption state to a lower power consumption state when the time interval exceeds a predetermined value. For example, the power consumption state may be changed from an active servo state to an intermediate power consumption state, a park state, and/or a standby state, depending on the time elapsed since a most recent time data has been read from or written to the magnetic storage device.

A method of power management in a data storage device that includes a magnetic storage device comprises, according to one embodiment, measuring a time interval since a most recent time data has been read from or written to the magnetic storage device, and, in response to the time interval exceeding a predetermined value, changing a current power consumption state of the magnetic storage device to a lower power consumption state.

According to another embodiment, a data storage device comprises a magnetic storage device and a controller. The controller is configured to measure a time interval since a most recent time data has been read from or written to the magnetic storage device, and, in response to the time interval exceeding a predetermined value, change a current power consumption state of the magnetic storage device to a lower power consumption state.

According to another embodiment, a data storage device comprises a magnetic storage device, a non-volatile solid-state device, and a controller. The controller is configured to determine that a portion of the non-volatile solid-state device used to store data that are not also stored on the magnetic storage device is greater than a predetermined value, change a power state of the magnetic storage device from an initial power state to an active servo state, the initial power state being a lower power state than the active servo state, and control the writing to the magnetic storage device of at least a portion of the data that are not also stored on the magnetic storage device.

BRIEF DESCRIPTION OF THE DRAWINGS

So that the manner in which the above recited features of the embodiments can be understood in detail, a more particular description of the embodiments, briefly summarized above, may be had by reference to the appended drawings. It is to be noted, however, that the appended drawings illustrate only typical embodiments and are therefore not to be considered limiting of its scope, for there may be other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
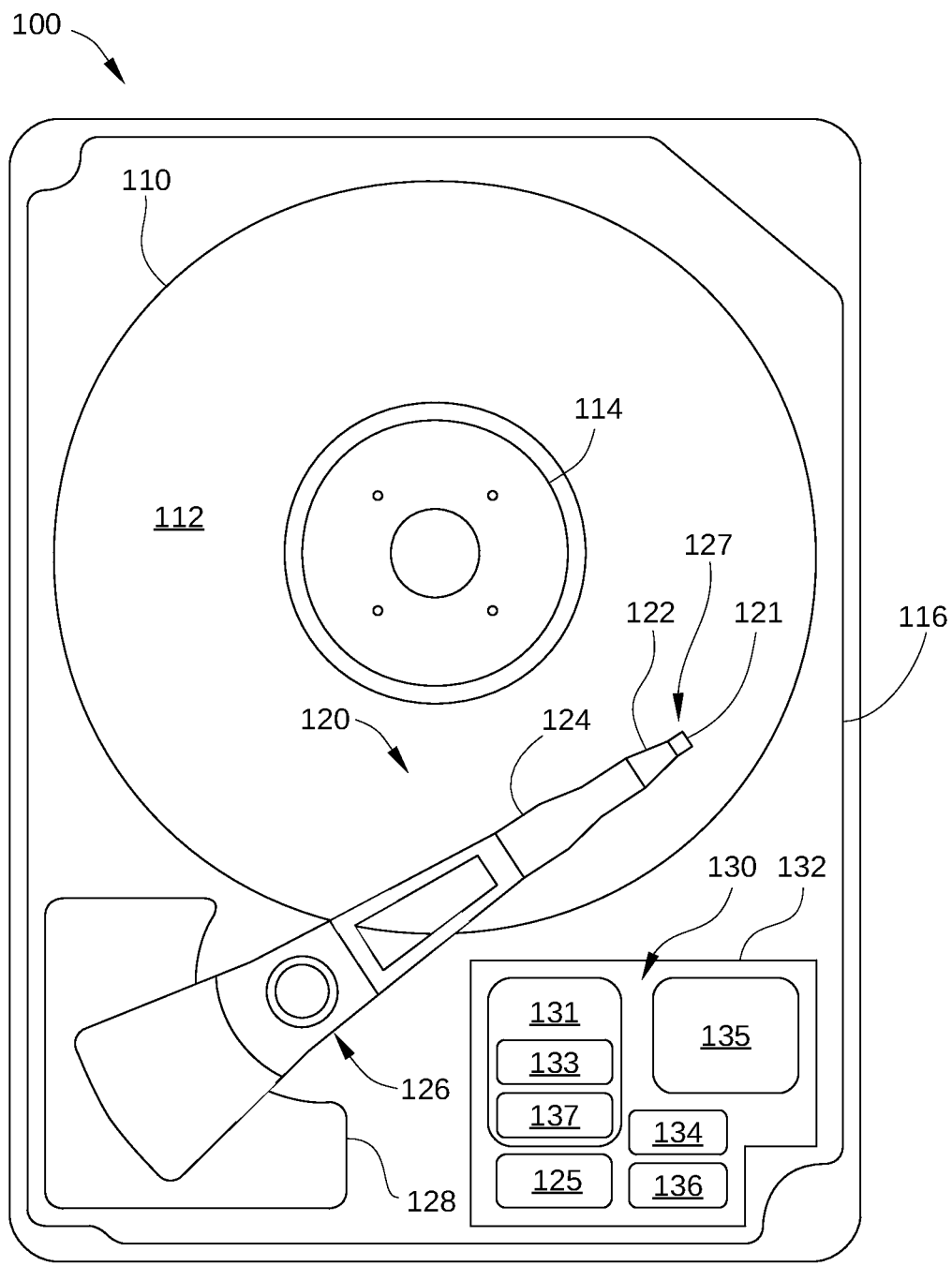
FIG. 1 is a schematic view of an exemplary disk drive, according to one embodiment.

FIG. 1 is a schematic view of an exemplary disk drive, according to one embodiment. For clarity, disk drive 100 is illustrated without a top cover. Disk drive 100 includes at least one storage disk 110 that is rotated by a spindle motor 114 and includes a plurality of concentric data storage tracks. Spindle motor 114 is mounted on a base plate 116. An actuator arm assembly 120 is also mounted on base plate 116, and has a slider 121 mounted on a flexure arm 122 with a read/write head 127 that reads data from and writes data to the data storage tracks. Flexure arm 122 is attached to an actuator arm 124 that rotates about a bearing assembly 126. Voice coil motor 128 moves slider 121 relative to storage disk 110, thereby positioning read/write head 127 over the desired concentric data storage track disposed on the surface 112 of storage disk 110. Spindle motor 114, read/write head 127, and voice coil motor 128 are coupled to electronic circuits 130, which are mounted on a printed circuit board 132. Electronic circuits 130 include a read/write channel 137, a microprocessor-based controller 133, random-access memory (RAM) 134 (which may be a dynamic RAM and is used as a data buffer), and/or a flash memory device 135 and flash manager device 136. In some embodiments, read/write channel 137 and microprocessor-based controller 133 are included in a single chip, such as a system-on-chip 131. In some embodiments, disk drive 100 may further include a motor-driver chip 125, which accepts commands from microprocessor-based controller 133 and drives both spindle motor 114 and voice coil motor 128.

For clarity, disk drive 100 is illustrated with a single storage disk 110 and a single actuator arm assembly 120. Disk drive 100 may also include multiple storage disks and multiple actuator arm assemblies. In addition, each side of storage disk 110 may have an associated read/write head coupled to a flexure arm.

When data are transferred to or from storage disk 110, actuator arm assembly 120 sweeps an arc between an inner diameter (ID) and an outer diameter (OD) of storage disk 110. Actuator arm assembly 120 accelerates in one angular direction when current is passed in one direction through the voice coil of voice coil motor 128 and accelerates in an opposite direction when the current is reversed, thereby allowing control of the position of actuator arm assembly 120 and attached read/write head 127 with respect to storage disk 110. Voice coil motor 128 is coupled with a servo system known in the art that uses the positioning data read from servo wedges on storage disk 110 by read/write head 127 to determine the position of read/write head 127 over a specific data storage track. The servo system determines an appropriate current to drive through the voice coil of voice coil motor 128, and drives said current using a current driver and associated circuitry.

Disk drive 100 may be configured as a disk drive, in which non-volatile data storage is generally only performed using storage disk 110 in typical operation. Alternatively, disk drive 100 may be configured as a hybrid drive, in which non-volatile data storage can be performed using storage disk 110 and/or flash memory device 135. In a hybrid drive, non-volatile memory, such as flash memory device 135, supplements the spinning storage disk 110 to provide faster boot, hibernate, resume and other data read-write operations, as well as lower power consumption. Such a hybrid drive configuration is particularly advantageous for battery operated computer systems, such as mobile computers or other mobile computing devices. In a preferred embodiment, flash memory device 135 is a non-volatile solid state storage medium, such as a NAND flash chip that can be electrically erased and reprogrammed, and is sized to supplement storage disk 110 in disk drive 100 as a non-volatile storage medium. For example, in some embodiments, flash memory device 135 has data storage capacity that is orders of magnitude larger than RAM 134, e.g., gigabytes (GB) vs. megabytes (MB).

Figure 2:
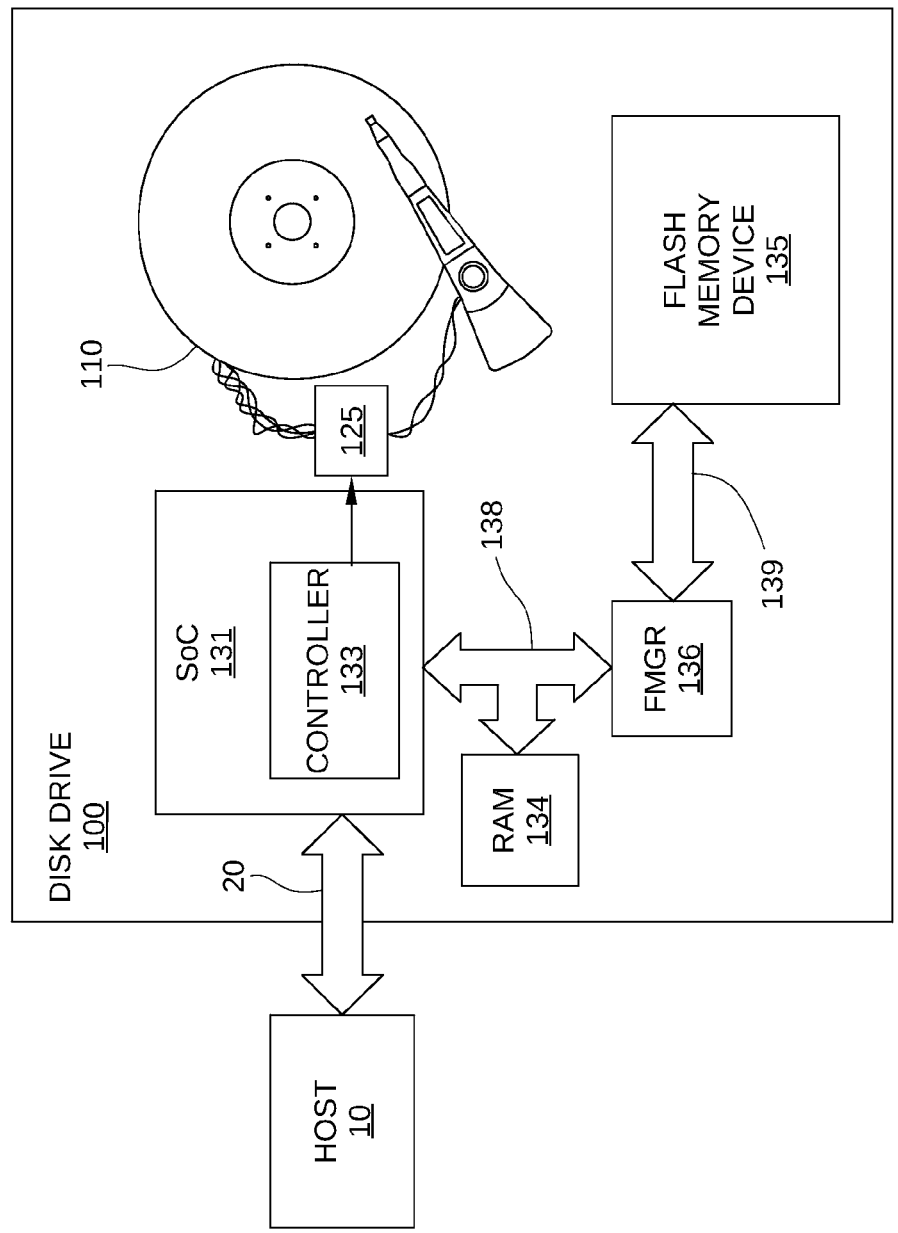
FIG. 2 illustrates an operational diagram of a disk drive with elements of electronic circuits shown configured according to one embodiment.

FIG. 2 illustrates an operational diagram of disk drive 100 with elements of electronic circuits 130 shown configured according to one embodiment. As shown, disk drive 100 includes RAM 134, flash memory device 135, a flash manager device 136, system-on-chip 131, and a high-speed data path 138. Disk drive 100 is connected to a host 10, such as a host computer, via a host interface 20, such as a serial advanced technology attachment (SATA) bus.

In the embodiment illustrated in FIG. 2, flash manager device 136 controls interfacing of flash memory device 135 with high-speed data path 138 and is connected to flash memory device 135 via a NAND interface bus 139. System-on-chip 131 includes microprocessor-based controller 133 and other hardware (including read/write channel 137) for controlling operation of disk drive 100, and is connected to RAM 134 and flash manager device 136 via high-speed data path 138. Microprocessor-based controller 133 is a control unit that may include a microcontroller such as an ARM microprocessor, a hybrid drive controller, and any control circuitry within disk drive 100. High-speed data path 138 is a high-speed bus known in the art, such as a double data rate (DDR) bus, a DDR2 bus, a DDR3 bus, or the like.

In general, data storage devices with rotatable storage disks, such as disk drives, can be configured to minimize energy use by changing to lower power-consumption states when the data storage device is not being used to satisfy read or write commands from a host device. This is particularly true for disk drives used in battery-powered devices, such as laptop computers. For example, when a data storage device has not received host commands for a predetermined time period, the data storage device may change from an active servo state to an intermediate power consumption state, a park state, or a standby state. In contrast, according to various embodiments, a data storage device changes from a first power consumption state to a second power consumption state based on a time interval in which a rotatable storage disk or disks of the data storage device are not accessed to satisfy read or write commands. For example, in reference to disk drive 100 illustrated in FIGS. 1 and 2, when read or write commands are exclusively satisfied using RAM 134 and/or flash memory device 135, actuator arm assembly 120, voice coil motor 128, spindle motor 114, read/write channel 137 and/or microprocessor-based controller 133 may be operated at a lower power consumption state, since storage disk 110 is not being accessed.

Figure 3:
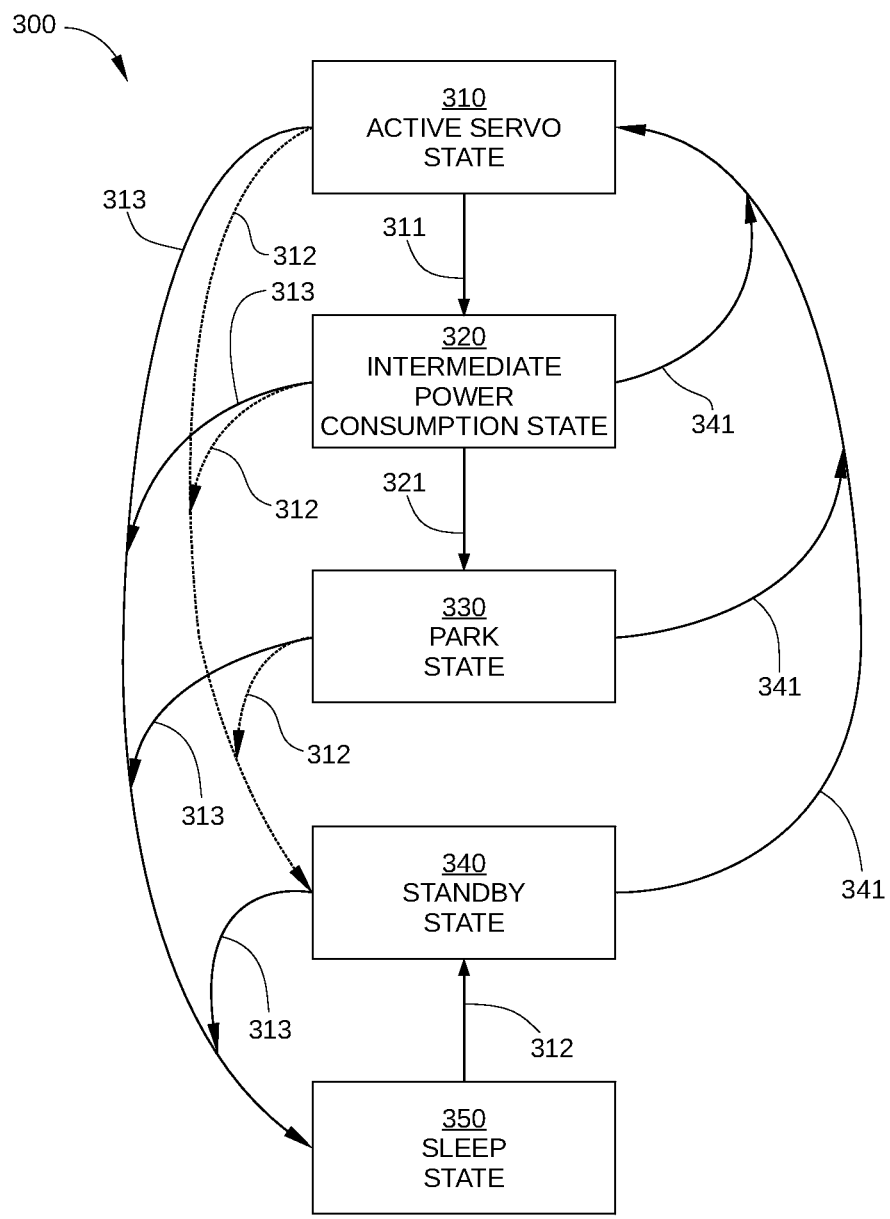
FIG. 3 illustrates a power-state diagram of the disk drive of FIG. 1.

FIG. 3 illustrates a power-state diagram 300 for disk drive 100 that includes multiple power states and power state transitions of disk drive 100. Power states in power-state diagram 300 include an active servo state 310, an intermediate power consumption state 320, a park state 330, a standby state 340, and a sleep state 350. State transitions in power-state diagram 300 include a float timer expiration 311, a standby transition 312, a sleep command 313, a park timer expiration 321, and an active servo transition 341. While the elements of power-state diagram 300 are described in terms of disk drive 100, it should be recognized that power-state diagram 300 is applicable to any suitable data storage device that includes a rotatable storage disk.

Active servo state 310 represents normal operation of disk drive 100 to facilitate the execution of read and write commands, either from host 10 or initiated by disk drive 110 itself. In active servo state 310, the servo system of disk drive 100 actively controls the position of read/write head 127 with respect to individual tracks on storage disk 110, using voice coil motor 128, actuator arm 124, and read/write channel 137. It is noted that disk drive 100 may be in active servo state 310 when read or write commands are not being serviced by disk drive 100. However, because significant electrical energy is used by microprocessor-based controller 133 and read/write channel 137 in active servo state 310, in some embodiments, disk drive 100 changes to a lower power consumption state when one or more conditions are met. As shown in FIG. 3, these conditions may include one or more of: float timer expiration 311, standby transition 312, and sleep command 313.

When float timer expiration 311 occurs, disk drive 100 changes from active servo state 310 to intermediate power consumption state 320, which is described below. Float timer expiration 311 can be configured to take effect when no commands are satisfied by accessing storage disk 110 for more than a predetermined period of time. For example, a typical duration for such a predetermined time period may be approximately 50 to 150 milliseconds. In some embodiments, a float timer is started when a command, i.e., a read or write command, is satisfied by accessing storage disk 110. The float timer is reset to zero and restarted when a received command is satisfied by accessing storage disk 110. Thus, float timer expiration 311 takes effect when the float timer exceeds the predetermined time period described above, and disk drive 100 changes to intermediate power consumption state 320. In some embodiments, any read or write commands satisfied by accessing storage disk 110 resets the float timer to zero, and in other embodiments, only read or write commands that are both satisfied by accessing storage disk 110 and that are received from host 10 reset the float timer to zero.

It is noted that commands (either received by disk drive 100 from host 10 or initiated by disk drive 100 itself) that are satisfied without accessing storage disk 110 do not reset the above-described float timer. Consequently, even though read and/or write commands are frequently received by disk drive 100 from host 10 and/or initiated by disk drive 100, portions of disk drive 100 associated with storage disk 110 can be changed from active servo state 310 to intermediate power consumption state 320 when said commands are satisfied by accessing RAM 134 and/or flash memory device 135 but not storage disk 110.

When standby transition 312 occurs, disk drive 100 changes from a current energy consumption state to standby state 340, in which disk drive 100 spins down storage disk 110, read/write head 127 is parked, and disk drive 100 expends essentially no energy on mechanical operations. Standby transition 312 may occur when disk drive 100 is in one of several power states, including active servo state 310, intermediate power consumption state 320, and park state 330. In some embodiments, standby transition 312 can be configured to take effect when either one of two conditions are met: 1) no commands from host 10 are satisfied by accessing storage disk 110 for more than a predetermined period of time, and 2) when a "standby" command is received from host 10. In other embodiments, standby transition 312 can be configured to take effect when: 1) no commands from host 10 or initiated by disk drive 100 are satisfied by accessing storage disk 110 for more than a predetermined period of time, and 2) when a "standby" command is received from host 10.

Generally, the predetermined period of time associated with standby transition 312 is substantially longer than that associated with float timer expiration 311. For example, a typical duration of time associated with initiating standby transition 312 can be on the order of several minutes rather than milliseconds. In some embodiments, a standby timer is started when a command is satisfied by accessing storage disk 110, and the standby timer is reset to zero and restarted when a command is next satisfied by accessing storage disk 110. In other embodiments, the standby timer is started when a command received from host 10 is satisfied by accessing storage disk 110, while a command that is initiated by disk drive 110 and is satisfied by accessing storage disk 110 does not reset the standby timer to zero.

When standby transition 312 occurs, i.e., when the standby timer exceeds the predetermined time period described above, disk drive 100 changes to standby state 340. In some embodiments, commands that are 1) received by disk drive 100 from host 10 or initiated by disk drive 100 itself, and 2) are satisfied without accessing storage disk 110, do not generally reset the herein-described standby timer.

Sleep command 313, when received from host 10, causes disk drive 100 to change from a current power state to sleep state 340. Sleep command 313 may occur when disk drive 100 is in one of several power states, including active servo state 310, intermediate power consumption state 320, and park state 330.

Intermediate power consumption state 320, in which the servo system of disk drive 100 is not used to provide continuous position control of read/write head 127, uses less power than active servo state 310 and more power than park state 330. For example, in some embodiments, microprocessor-based controller 133 may apply a predetermined constant bias to voice coil motor 128 to hold read/write head 127 in place, thereby "floating" read/write head 127 rather than actively servoing the position of read/write head 127. In alternative embodiments, a low-frequency servo mode may be used in intermediate power consumption state 320, in which limited servo control is used to position read/write head 127 in an approximate location. For example, the servo system of disk drive 100 may be activated for a single or a relatively small number of samples for each revolution of storage disk 110, so that the position of read/write head 127 is approximately known without the relatively high energy cost associated with constantly servoing read/write head 127 over a particular data storage track of storage disk 110.

While using less energy than active servo state 310, intermediate power consumption state 320 allows relatively fast response to read or write commands that involve accessing storage disk 110. For example, when disk drive 100 is in intermediate power consumption state 320 and receives a read or write command, seeking to a desired location on storage disk 110 in response to said command can be completed in a few milliseconds to a few tens of milliseconds. In contrast, when disk drive is in park state 320, seeking to a desired location on storage disk 110 in response to said command generally requires a few hundred milliseconds. In some embodiments, disk drive 100 changes from intermediate power consumption state 320 to a lower power consumption state when one or more conditions are met. As shown in FIG. 3, these conditions may include one or more of: standby transition 312, sleep command 313 (both described above) and park timer expiration 321.

When park timer expiration 321 occurs, disk drive 100 changes from intermediate power consumption state 320 to park state 330. In park state 330, storage disk 110 continues to spin at the normal rotational velocity, but read/write head 127 is parked to reduce aerodynamic resistance to spinning the data storage disk. In this way, current required for the rotation of storage disk 110 is reduced. Furthermore, in park state 330, read/write head 127 is protected from mechanical shock experienced by disk drive 100. Park timer expiration 321 can be configured to take effect when no commands are satisfied by accessing storage disk 110 for more than a predetermined period of time. Alternatively, park timer expiration 321 can be configured to take effect when no commands from host 10 are satisfied by accessing storage disk 110 for more than a predetermined period of time.

Generally, the predetermined period of time associated with park timer expiration 321 is substantially longer than that associated with float timer expiration 311. For example, a typical duration of time associated with park timer expiration 321 can be on the order of several minutes rather than the milliseconds associated with float timer expiration 311. In some embodiments, a park timer is started when a command is satisfied by accessing storage disk 110, and the park timer is reset to zero and restarted when a command is satisfied by accessing storage disk 110. When park timer expiration 321 occurs, i.e., when the park timer exceeds the predetermined time period described above, disk drive 100 changes to park state 330. It is noted that commands that are satisfied without accessing storage disk 110 do not generally reset the herein-described park timer. Said commands can be either received by disk drive 100 from host 10 or initiated by disk drive 100 itself, such as when controller 133 determines that data stored in flash memory device 135 should be written on data storage disk 110.

In addition to changing to a lower power consumption state when certain events occur, e.g., float timer expiration 311, standby transition 312, sleep command 313, and park timer expiration 321, disk drive 100 may also change to a higher power consumption state when certain events occur. Specifically, when active servo transition 341 occurs, disk drive 100 may be configured to change to active servo state 310, as shown in FIG. 3. In some embodiments, active servo transition 341 takes place when a read or write command is satisfied by accessing storage disk 110. For example, if a current version of the data associated with a read command from host 10 is not stored in RAM 134 or flash memory 135, storage disk 110 is accessed by microprocessor-based controller 133 to satisfy said read command. Thus, even when disk drive 100 is in a low power consumption state, such as standby state 340 or park state 330, disk drive 100 changes to active servo state 310 so that storage disk 110 can be accessed to satisfy the command received from host 10.

In some embodiments, disk drive 100 may change to active servo state 310 in response to data being flushed to storage disk 110 from flash memory device 135. For example, when disk drive 100 is configured as a hybrid drive, a portion of flash memory device 135 may be used to store "dirty" data, which are data that are only stored in flash memory device 135 and are not also stored on storage disk 110. Furthermore, disk drive 100 may also be configured to maintain a predetermined maximum threshold for the portion of flash memory device 135 used to store dirty data. When said maximum threshold is exceeded, disk drive 100 generally "flushes" excess dirty data to storage disk 110, i.e., disk drive 100 writes a corresponding copy of the excess dirty data on storage disk 110, and flags the copied data in flash memory device 135 as "non-dirty" data. Thus, in some situations, disk drive 100 may flush dirty data to storage disk 110, even though disk drive 100 is in intermediate power consumption state 320, park state 330, or standby state 340. In such situations, disk drive 100 changes to active servo state 310 so that the data flushing process can be performed. For example, after disk drive 100 changes to a lower power consumption state as a result of float timer expiration 311, standby transition 312, sleep command 313, or park timer expiration 321, host 10 may then send write commands to disk drive 100. Ordinarily, disk drive 100 may accept write data directly into flash memory device 135 to prevent activating the portions of disk drive 100 associated with storage disk 110. However, if flash memory device 135 is full or already stores the maximum allowable quantity of dirty data, microprocessor-based controller 133 will change the power state of disk drive 100 to active servo state 310 and begin to copy dirty data in flash memory device 135 to storage disk 110.

In some embodiments, storage disk 110 may be accessed as a result of other activities besides in response to commands from host 10. Advantageously, in such embodiments, timers for measuring time elapsed since storage disk 110 was last accessed in response to a host command may not be affected when storage disk 110 is accessed as a result of said non-host related activities. For example, dirty data being flushed from flash memory device 135 or RAM 134 may be considered such non-host related activities.

Figure 4:
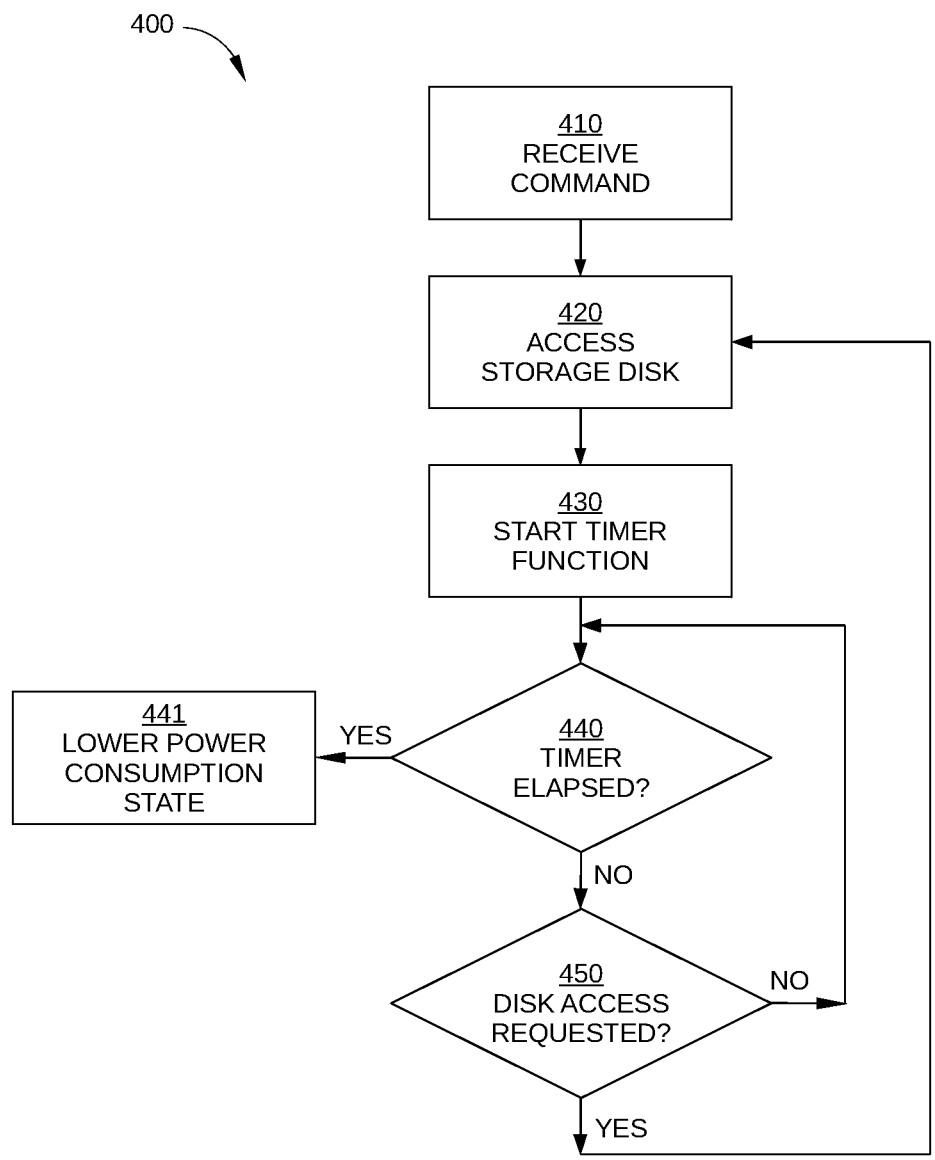
FIG. 4 sets forth a flowchart of method steps for power management in a data storage device that includes a magnetic storage device, according to one or more embodiments.

FIG. 4 sets forth a flowchart of method steps for power management in a data storage device that includes a magnetic storage device, according to one or more embodiments. Although the method steps are described in conjunction with disk drive 100 in FIGS. 1 and 2, persons skilled in the art will understand that method 400 may be performed with other types of data storage systems. The control algorithms for method 400 may reside in and/or be performed by microprocessor-based controller 133, host 10, or any other suitable control circuit or system. For clarity, method 400 is described in terms of microprocessor-based controller 133 performing steps 410-450.

As shown, method 400 begins at step 410, where microprocessor-based controller 133 or other suitable control circuit or system receives a command that requires access to storage disk 110. For example, the command received in step 410 may be a read command when the only up-to-date version of data associated with the read command is stored on storage disk 110. In another example, the command received in step 410 may be a write command, where insufficient storage space is available in flash memory device 135 and/or RAM 134 for storing the data associated with the write command. In yet another example, the command received in step 410 may be a flush-cache command from host 10 requesting that disk drive 100 flush some or all dirty data in flash memory device 135 and/or RAM 134 to storage disk 110. In yet another example, the command received in step 410 may be a write command initiated by disk drive 100 itself, such as when flash memory device 135 stores equal to or greater than a maximum desired quantity of dirty data.

In step 420, microprocessor-based controller 133 controls access to storage disk 110 in response to the command received in step 410. In step 420, data are written to and/or read from storage disk 110 to satisfy the command received in step 410.

In step 430, microprocessor-based controller 133 starts a timer function or other technically feasible time measurement technique in response to storage disk 110 being accessed in step 420. Generally, the timer function is started upon completion of access to storage device 110 in step 420, but in some embodiments may be started in conjunction with said access.

In step 440, microprocessor-based controller 133 checks the time interval measured by the timer function started in step 430. In some embodiments, step 440 is performed periodically, for example every 10 milliseconds. When the time interval measured by said timer function exceeds a predetermined value, i.e., a desired time interval has elapsed, method 400 proceeds to step 441. When the time interval measured by said timer function does not exceed the predetermined value, i.e., the desired time interval has not yet elapsed, method 400 proceeds to step 450.

According to various embodiments, the time interval in question is associated with one of the power state transitions to a lower power consumption state, as described above in conjunction with FIG. 3. Specifically, in some embodiments, the time interval referenced in step 440 is the time associated with float timer expiration 311, and may therefore be on the order of 10s to 100s of milliseconds in duration. In other embodiments, the time interval referenced in step 440 is the time associated with standby transition 312, and may therefore be on the order of a few minutes, to 10s of minutes in duration, and in some instances may be defined by host 10. In yet other embodiments, the time interval referenced in step 440 is the time associated with park timer expiration 321, and may therefore be on the order of a few minutes or longer in duration.

In step 441, microprocessor-based controller 133 changes the power state of disk drive 100 from the current power state, e.g., active servo state 310, to a desired lower power consumption state, such as intermediate power consumption state 320, park state 330, or standby state 340. In some embodiments, in step 441 additional power management processes described herein may be initiated, such as checking for a condition causing disk drive 110 to change to an even lower energy consumption state, such as standby state 340. In such embodiments, the condition may be an elapsed time since storage disk 110 has been accessed in order to satisfy a command. For clarity, blocks illustrating such an additional power management process are omitted from FIG. 4.

In some embodiments, during the course of method 400 disk drive 100 may be changed to standby state 340 in response to a standby command from host 10. In such embodiments, when a standby command is received by microprocessor-based controller 133 from host 10, microprocessor-based controller 133 terminates method 400 and immediately changes disk drive 10 to standby state 340.

In step 450, microprocessor-based controller 133 determines whether access to storage disk 110 has been requested in order to satisfy a command received since step 420. If such a request has been received by microprocessor-based controller 133, method 400 proceeds back to step 420, where said command is satisfied by accessing storage disk 110. If such a request has not been received by microprocessor-based controller 133 since step 420, method 400 proceeds back to step 440, as shown in FIG. 4.

It is noted that in step 450, one or more commands may be received by disk drive 100 since step 420 without resetting the timer function started in step 430, as long as storage disk 110 is not accessed in response to said host commands. For example, read or write commands from host 10 that are satisfied using RAM 134 and/or flash memory device 135 do not reset the timer function in step 401. Similarly, in some embodiments, flushing of dirty data from flash memory device 135 to storage disk 110, when performed internally as a non-host related activity by disk drive 100, does not reset said timer function. In other embodiments, flushing of dirty data from flash memory device 135 to storage disk 110, when performed internally as a non-host related activity by disk drive 100, resets the some timer functions (e.g., a float timer for float timer expiration 311 or a park timer for park timer expiration 321), but not for others (e.g., a standby timer for standby transition 312). Furthermore, it is noted that method 400 may be used to change disk drive 100 to any of the power states associated with disk drive 100 that are lower in power consumption than active servo state 310, including intermediate power consumption state 320, park state 330, and standby state 340.

While various embodiments described herein are in terms of a hard disk drive, embodiments also include data storage devices that include a data storage disk, such as an optical disk drive, etc.

In sum, embodiments described herein provide systems and methods for power management in a data storage device. The data storage device selects one or more power states of the magnetic storage device based on a time interval during which the magnetic storage device is not accessed in response to a host command. Consequently, the magnetic storage device can be advantageously changed to a lower power consumption state even though the data storage device is actively serving a host device.

While the foregoing is directed to specific embodiments, other and further embodiments may be devised without departing from the basic scope thereof, and the scope thereof is determined by the claims that follow.

We claim:

1. A method of power management in a data storage device that includes a magnetic storage device and a non-volatile solid-state memory device, the method comprising:
using a timer, measuring a time interval since a most recent time data has been read from or written to the magnetic storage device to satisfy a host command, the timer being reset each time data are read from or written to the magnetic storage device to satisfy the host command and not being reset each time data are read from or written to the non-volatile solid-state memory device to satisfy the host command; and
in response to the time interval exceeding a predetermined value, changing a current power consumption state of the magnetic storage device to a lower power consumption state, wherein
the current power consumption state includes an active servo state and the lower power consumption state comprises a low-frequency servo state;
wherein, in the low-frequency servo state, the servo system of the magnetic storage device performs servo control for positioning a magnetic head of the magnetic storage device with a lower frequency of samples per revolution of a disk of the magnetic storage device than when the servo system of the magnetic storage device is in the current power consumption state.

2. The method of claim 1, wherein in the low-frequency servo state, the servo system of the magnetic storage device performs servo control for positioning the magnetic head with only a single sample per revolution of the disk of the magnetic storage device.

3. The method of claim 1, further comprising:
receiving one or more host commands; and
satisfying the one or more host commands using at least one of a volatile solid-state memory device of the data storage device and the non-volatile solid-state memory device of the data storage device,
wherein satisfying the one or more host commands using the volatile solid-state memory device or the non-volatile solid-state memory device does not reset the timer.

4. The method of claim 1, further comprising:
accessing the magnetic storage device to satisfy read or write commands that are not host read or write commands,
wherein accessing the magnetic storage device to satisfy read or write commands that are not host read or write commands does not reset the timer.

5. A method of power management in a storage device, the method comprising:
using a timer, measuring a time interval since a most recent time the storage device has been accessed to satisfy a host command, the timer being reset each time the storage device is accessed to satisfy the host command; and
in response to the time interval exceeding a predetermined value, changing a current power consumption state of the storage device to a lower power consumption state, wherein the current power consumption state comprises an active servo state and the lower power consumption state comprises a low-frequency servo state;

wherein, in the low-frequency servo state, the servo system of the magnetic storage device performs servo control for positioning a magnetic head of the magnetic storage device with a lower frequency of samples per revolution of a disk of the magnetic storage device than when the servo system of the magnetic storage device is in the current power consumption state.

6. The method of claim 5, wherein the storage device includes a magnetic storage device and a non-volatile solid-state memory device, and the method further comprises measuring a time interval since a most recent time data has been read from or written to the magnetic storage device to satisfy the host command, the timer being reset each time data are read from or written to the magnetic storage device to satisfy the host command and not being reset each time data are read from or written to the non-volatile solid-state memory device to satisfy the host command.

7. A data storage device, comprising:

a magnetic storage device; and a controller configured to:

measure a time interval since a most recent time data has been read from or written to the magnetic storage device to satisfy a host command using a timer, the timer being reset each time data are read from or written to the magnetic storage device to satisfy the host command, the timer not being reset when the controller accesses the magnetic storage device to satisfy read or write commands that are not host commands; and in response to the time interval exceeding a predetermined value, change a current power consumption state of the magnetic storage device to a lower power consumption state, wherein the current power consumption state comprises an active servo state and the lower power consumption state comprises applying a predetermined constant bias to a voice coil motor of the magnetic storage device to float a read/write head of the magnetic storage device at a radial location over a disk of the magnetic storage device.

8. A data storage device, comprising:

a magnetic storage device;

a volatile solid-state memory device;

a non-volatile solid-state memory device; and a controller configured to:

measure a time interval since a most recent time data has been read from or written to the magnetic storage device to satisfy a host command using a timer, the timer being reset each time data are read from or written to the magnetic storage device to satisfy the host command, the timer not being reset when the controller satisfies the host command using one of the volatile solid-state memory device, the non-volatile solid-state memory device, and a combination of both, without accessing the magnetic storage device; and in response to the time interval exceeding a predetermined value, change a current power consumption state of the magnetic storage device to a lower power consumption state, wherein the current power consumption state comprises an active servo state and the lower power consumption state comprises applying a predetermined constant bias to a voice coil motor of the magnetic storage device to float a read/write head of the magnetic storage device at a radial location over a disk of the magnetic storage device.

* * * * *